Aug. 10, 1954 C. A. DEMBY 2,685,950

AUTOMATIC STOP DEVICE FOR POWER-DRIVEN FLEXIBLE MEMBERS

Filed Oct. 27, 1950

INVENTOR.
CHESTER A. DEMBY
BY
Frederick Diehl
ATTORNEY

Patented Aug. 10, 1954 2,685,950

UNITED STATES PATENT OFFICE 2,685,950

AUTOMATIC STOP DEVICE FOR POWER-DRIVEN FLEXIBLE MEMBERS

Chester A. Demby, Burbank, Calif.

Application October 27, 1950, Serial No. 192,580

3 Claims. (Cl. 192—127)

This invention relates generally to flexible members such as the tape or wire record medium of magnetic sound recording and reproducing machines.

An object of this invention is to provide a device, particularly adapted, although not necessarily, for operative association with a magnetic sound recording and reproducing machine of the general character embodied in my co-pending application for patent, Serial No. 187,888, filed October 2, 1950, and wherein is disclosed a flexible record medium such as a tape or wire which is power driven by an electric motor to feed the medium from one reel to another during the recording or reproducing operation of the machine, the device being operable automatically in response to breaking of the record tape or wire, to instantly stop the machine so as to prevent further breaking of the tape or tangling thereof, as well as damage to the mechanism.

Another object of this invention is to provide a stop device as above characterized, which is non-responsive to a momentarily slack condition of the flexible member, so as to avoid unnecessary stopping of the machine and only stop the latter should actual breaking of the member occur.

Still another object of this invention is to provide a stop device of the above described character which is simple, inexpensive in construction so as to enable it to be manufactured at small cost, and which is readily applicable to machines generally which utilize flexible power driven members such as belts, webs, tapes, wires, etc. in the operation of such machines.

With these and other objects in view, this invention resides in the combinations, arrangements and functional relationships of elements as set forth in the following specification and particularly pointed out in the appended claims.

In the accompanying drawings.

Figures 1, 2, 3, 4, 5:
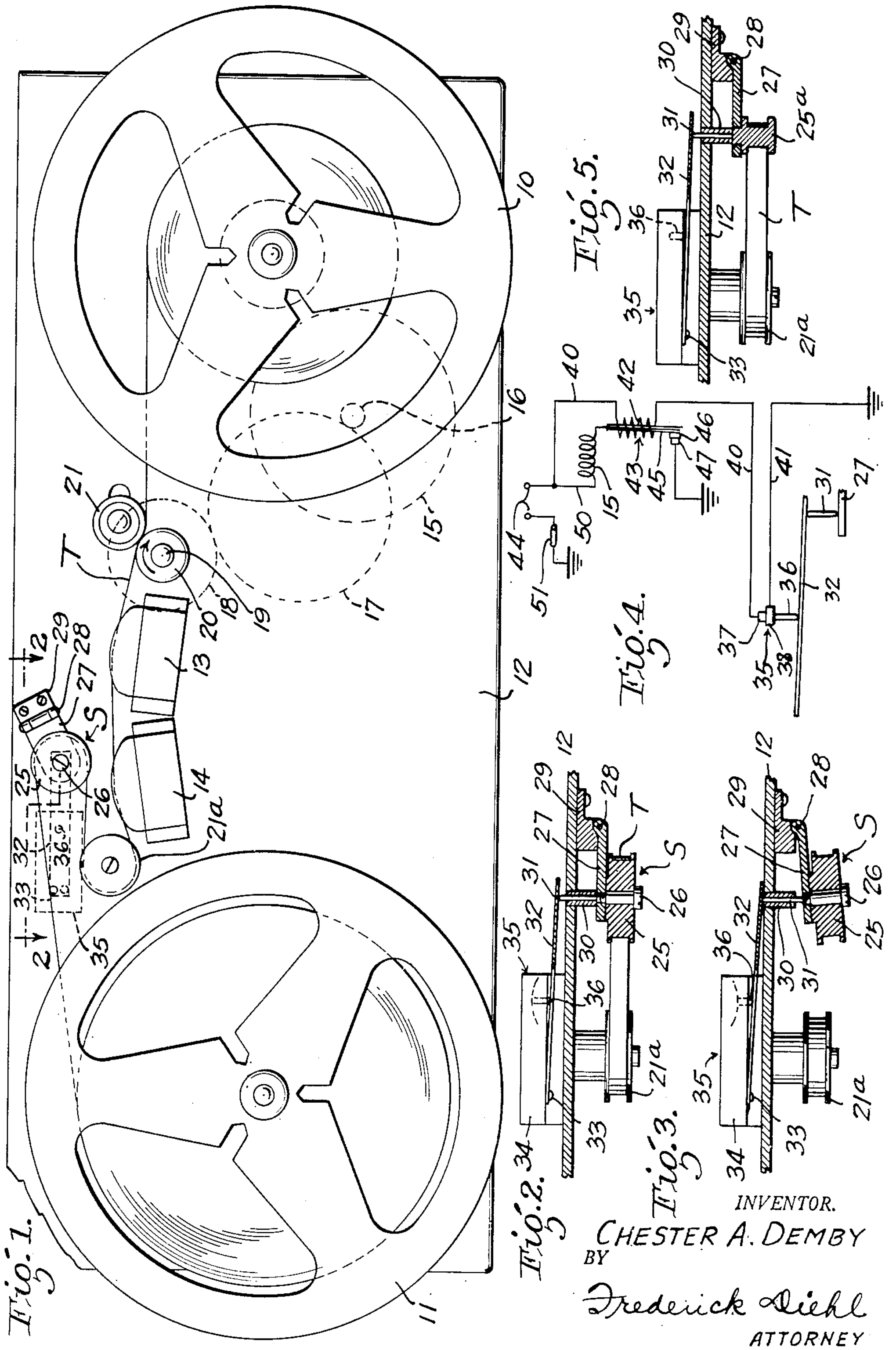
Figure 1 is a view showing in front elevation, one form of stop device for power driven flexible members embodying this invention, applied to a magnetic sound recording and reproducing machine.
Figure 2 is an enlarged transverse sectional view taken on the line 2—2 of Figure 1, and illustrating the position of the stop device during normal operation of the machine.
Figure 3 is a view similar to Figure 2 and illustrating the position of the device in response to breaking of the record tape.
Figure 4 is a diagrammatic view illustrating the electrical circuits with which the stop device is associated to control operation of the machine.
Figure 5 is a view similar to Figure 2 and illustrating a modified form of stop device embodying this invention.

Referring specifically to the drawings, this invention is shown for the purpose of illustration only, associated with a magnetic sound recording and reproducing machine of the type employing a flexible tape T as the record medium which is trained upon reels 10 and 11 journaled in a suitable frame 12 and arranged to traverse conventional magnetic recording and reproducing heads 13 and 14 supported on the frame between the reels. An electric motor 15 is supported in the frame 12 and has its shaft 16 in frictional driving engagement with a friction wheel 17, the latter driving a second friction wheel 18 fixed to a shaft 19 having a capstan 20 against which the tape T is pressed by a friction roller 21, so as to be driven by the capstan when current is supplied to the motor 15.

Between the head 14 and the reel 11, the tape T is trained about an idler pulley 21*a* so as to be guided thereby into magnetic relationship with the magnets of the heads 13 and 14. For the purpose of illustration, the stop device embodying this invention which is designated generally at S, comprises a guide element which may be either in the form of a rotatably mounted flanged idler roller 25 as shown in Figures 1, 2 and 3, or a non-rotatably mounted flanged pin 25*a* as shown in Figure 5. In all other respects the stop device is structurally the same regardless of whether the roller 25 or the pin 25*a* is employed, so that a detailed description of the stop device in connection with the roller 25 as a part thereof will suffice.

The roller 25 is rotatably mounted on a headed pin 26 fixed to a rigid arm 27 hingedly mounted at 28 to a bracket 29 fixed to the frame 12 so as to mount the roller for movement bodily about the axis 28 as well as for rotary movement about the axis of the pin 26. The roller is located on the frame 12 in a position for the tape T to be trained about the roller between the reel 11 and the idler pulley 21*a* and to maintain the roller in the position shown in Figure 2 against bodily or revolving movement about the axis 28 in one direction so long as the tape is in the taut condition shown in Figure 1.

Fixed in an opening through the frame 12 is a bearing sleeve 30 in which is freely slidable axially a connector pin 31, one end of which engages the arm 27 at a location spaced from the axis 28 of the latter. The other end of the connector pin 31 is engaged by the free end portion of a resilient or flat spring member 32 fastened by screws 33 to the housing 34 of a conventional micro switch 35. The spring member 32 bears against the actuating pin or button 36 of the micro switch and co-acts therewith to maintain the contacts 37 and 38 of the switch closed when the roller 25 is being maintained by the taut tape T in the position shown in Figure 2, against movement bodily about the axis 28.

The contacts 37 and 38 are part of a control circuit (Figure 4) including conductors 40 and 41, the latter of which is grounded. In series with the conductor 40 is the heating coil 42 of a conventional thermo-responsive or time switch 43. The conductor 40 is connected to one terminal of a source of current supply 44, the other terminal of which is grounded. The bi-metallic member 45 of the time switch 43 is part of a power circuit including the motor 15 and contacts 46 and 47, the latter being stationary and grounded, and the contact 46 being carried by the member 45.

A conductor 50 connects the member 45 through the motor 15 to the ungrounded terminal of the source of current supply 44, so that when a main starting switch 51 in the power circuit is closed and the coil 42 is being heated by the closing of the control circuit at the contacts 37 and 38, the bi-metallic member 45 will be caused to maintain the contacts 46 and 47 in engagement and thus supply current from the source 44 to the motor 15 in the operation of the invention which is as follows:

With the tape T in a taut condition between the reels 10 and 11, the tape will co-act with the roller 25 in maintaining the control circuit closed at the contacts 37 and 38 through the medium of the connector pin 31, spring member 32 and actuating pin 36 of the micro switch 35 and against the normal tendency of the micro switch to open.

In this condition of the stop device, the spring member 32 is flexed so as to be loaded or stressed by the pressure of the connector pin 31 against the member. Thus, should the tape break and release the roller 25 for movement by its supporting arm 27 about the axis 28, the member 32, through the connector pin 31, will be free to swing the arm 27 about its axis 28 a sufficient amount for the contacts 37 and 38 of the micro switch 35 to disengage and break the control circuit at this point.

However, until the heating coil 42 of the time switch 43 has cooled sufficiently for the bi-metallic member 45 to open the power circuit at the contacts 46 and 47, the motor 15 will remain in operation. This time interval is very short and may be only one or two seconds, so that if there is a momentary slack condition of the tape, the attending momentary opening of the micro switch will not be sufficient for the heating coil 42 to cool and open the circuit to the motor 15. Thus unnecessary stopping of the motor will be avoided and the motor circuit disrupted only if an actual breaking of the tape occurs.

It will be understood that although the invention has been described in association with a specific type of machine, that the invention has a wide range of use in connection with various machines using belts, webs, tapes and other forms of flexible media normally maintained and subject to breaking when in operation. Furthermore, the activation of the stop device in response to breaking of the tape or other flexible medium, may be utilized for other purposes than disrupting a power or motor circuit as described.

What is claimed is:

1. An automatic stop device for power driven flexible members comprising: a guide element about which the flexible member is trained; means mounting said element for movement bodily at a location for the flexible member, when in a taut condition about the guide element, to maintain the element against movement bodily in one direction; means for moving said element bodily in said one direction should the flexible member become untrained from the element by breaking of the member; electrical means for driving the flexible member; switch means controlling said electrical driving means and responsive to movement of the guide element bodily in said one direction by breaking of the flexible member, to stop the driving of the member by said driving means, so as to prevent further breaking and tangling of the member; and thermostatic means controlling said switch means and operable in response to a momentary slack condition of the flexible member about the guide element, to render said switch means ineffective to stop the driving of the flexible member so as to avoid unnecessary stopping of the latter.

2. An automatic stop device for power driven flexible members comprising: a guide element about which the flexible member is trained; means mounting said element for movement bodily at a location for the flexible member, when in a taut condition about the guide element, to maintain the element against movement bodily in said one direction should the flexible member become untrained from the element by breaking of the member; means for driving the flexible member including an electric motor and an electrical circuit having a source of current supply for the motor and a switch for controlling the supply of current to the motor from said source; and means operable to open said switch in response to movement of the guide element bodily in said one direction by breaking of the flexible member, so as to stop the motor and prevent further breaking and damage to the member; said last means including a thermo-responsive switch operable to delay opening of the motor circuit sufficiently to prevent stopping of the motor should a momentary slack condition of the flexible member about said guide element cause a momentary movement of the latter bodily in said one direction, whereby to avoid unnecessary stopping of the motor.

3. An automatic stop device for power driven flexible members comprising: a guide element about which the flexible member is trained; means hingedly mounting the guide element for movement bodily at a location for the flexible member, when trained in a taut condition about the flexible member, to maintain the latter against movement bodily in one direction; means urging said element to move bodily in said one direction; means for driving the flexible member including an electric motor and an electrical circuit having a source of current supply for the motor and a switch for controlling the supply of current to the motor from said source; and means operable to open said switch in response to movement of the guide element bodily in said one direction by breaking of the flexible member, so as to stop the motor and prevent further breaking of the flexible member; the last said means including a thermo-responsive switch operable to delay opening of the motor circuit for a time interval sufficient to prevent stopping of the motor should a momentary slack condition of the flexible member about said guide element cause a momentary movement of the latter bodily in said one direction, whereby to avoid unnecessary stopping of the motor.

References Cited in the file of this patent

UNITED STATES PATENTS

| Number | Name | Date |
|---|---|---|
| 2,043,354 | Mallina | June 9, 1936 |
| 2,192,819 | Smith | Mar. 5, 1940 |
| 2,252,853 | Hoover | Aug. 19, 1941 |
| 2,285,677 | Myers | June 9, 1942 |
| 2,365,254 | Dolan | Dec. 19, 1944 |
| 2,385,616 | Eaton | Sept. 25, 1945 |
| 2,399,113 | Guenther | Apr. 23, 1946 |
| 2,434,406 | Hearth et al. | Jan. 13, 1948 |
| 2,552,459 | Rice | May 8, 1951 |

FOREIGN PATENTS

| Number | Country | Date |
|---|---|---|
| 642,050 | France | May 1, 1928 |